US012290912B2

(12) United States Patent
Albert et al.

(10) Patent No.: US 12,290,912 B2
(45) Date of Patent: May 6, 2025

(54) METHOD FOR INSTALLING A FASTENER IN A THROUGH-ORIFICE OF A BOX-TYPE STRUCTURE OPEN AT AT LEAST ONE END, AND TOOLING FOR CARRYING OUT THE METHOD

(71) Applicant: Airbus Operations SAS, Toulouse (FR)

(72) Inventors: Brice Albert, Toulouse (FR); Benjamin Trarieux, Toulouse (FR); Stéphane Daure, Toulouse (FR); Julien Bigot, Toulouse (FR); Damien Battistella, Toulouse (FR)

(73) Assignee: Airbus Operations SAS, Toulouse (FR)

( * ) Notice: Subject to any disclaimer, the term of this patent is extended or adjusted under 35 U.S.C. 154(b) by 453 days.

(21) Appl. No.: 17/684,646

(22) Filed: Mar. 2, 2022

(65) Prior Publication Data

US 2022/0281097 A1 Sep. 8, 2022

(30) Foreign Application Priority Data

Mar. 5, 2021 (FR) ........................................ 2102144

(51) Int. Cl.

| | |
|---|---|
| ***B25G 3/02*** | (2006.01) |
| ***B25B 11/00*** | (2006.01) |
| ***B25B 23/00*** | (2006.01) |
| ***B25G 1/04*** | (2006.01) |

(52) U.S. Cl.
CPC .............. *B25G 3/02* (2013.01); *B25B 11/002* (2013.01); *B25B 23/0021* (2013.01); *B25G 1/04* (2013.01); *Y10T 29/49948* (2015.01)

(58) Field of Classification Search
CPC ........... B25G 3/02; B25G 1/04; B25B 11/002; B25B 23/0021; B25B 23/08; B25B 27/14; B25B 31/00; Y10T 29/49948
See application file for complete search history.

(56) References Cited

U.S. PATENT DOCUMENTS

| | | | | |
|---|---|---|---|---|
| 10,328,568 | B1 | 6/2019 | Scibilio | |
| 10,730,169 | B2 * | 8/2020 | Strange | F16B 31/021 |
| 2014/0230612 | A1 | 8/2014 | Sun | |

FOREIGN PATENT DOCUMENTS

| | | | |
|---|---|---|---|
| GB | 883661 | A | 12/1961 |
| GB | 2415683 | A | 1/2006 |

OTHER PUBLICATIONS

French Search Report; priority document.

* cited by examiner

*Primary Examiner* — Lee A Holly
(74) *Attorney, Agent, or Firm* — Greer, Burns & Crain, Ltd.

(57) ABSTRACT

A method for installing a screw in at least one through-orifice of a box-type structure, including inserting a body of a first tool into the through-orifice from an external region of the box-type structure, moving the body in an internal region of the box-type structure, towards an end of the box-type structure, securing the screw to the body, the first tool comprising a link connected to the body which remains accessible from the external region during the inserting, moving and securing steps, pulling on the link from the external region until the shank of the screw is positioned in the through-orifice, and separating the body from the screw.

4 Claims, 3 Drawing Sheets

METHOD FOR INSTALLING A FASTENER IN A THROUGH-ORIFICE OF A BOX-TYPE STRUCTURE OPEN AT AT LEAST ONE END, AND TOOLING FOR CARRYING OUT THE METHOD

CROSS-REFERENCES TO RELATED APPLICATIONS

This application claims the benefit of the French patent application No. 2102144 filed on Mar. 5, 2021, the entire disclosures of which are incorporated herein by way of reference.

FIELD OF THE INVENTION

The present application relates to a method for installing a fastener in a through-orifice of a box-type structure that is open at at least one end, and to a tooling for carrying out the method.

BACKGROUND OF THE INVENTION

As illustrated in FIG. 1, an aircraft 10 comprises a fuselage 12 and wings 14 arranged on either side of the fuselage 12.

According to one embodiment, shown in FIGS. 1 to 2, each wing 14 has a first end 14.1 that is connected to the fuselage 12 and a second, free end 14.2. It comprises an upper wall 16.1, a lower wall 16.2, a leading edge 18.1 connecting the upper and lower walls 16.1, 16.2 at the front of the wing 14, and a trailing edge 18.2 connecting the upper and lower walls 16.1, 16.2 at the rear of the wing 14. The upper and lower walls 16.1, 16.2, and the leading and trailing edges 18.1, 18.2, together define an aerodynamic profile around which a flow of air flows during flight.

The terms “front” and “rear” refer to the direction of flow of the flow of air around the wing 14 during flight, which flows from front to rear.

As illustrated in FIG. 2, the wing 14 also comprises multiple longitudinal walls 20 which extend along the longitudinal of the wing 14 and which connect the upper and lower walls 16.1, 16.2. Thus, the wing 14 has a partitioned box structure that is open at at least one of its ends 14.1, 14.2. The longitudinal wall 20 located closest to the leading edge 18.1 is termed the front longitudinal wall 20. It separates the structure into an internal box 22 and an external box 24 that is open at the leading edge 18.1.

The wing 14 has a lift-increasing device comprising at least one leading-edge slat 26 which is positioned at the leading edge 18.1 and is able to move to change the aerodynamic profile of the wing 14. This leading-edge slat 26 is connected to the front longitudinal partition 20 by means of joints.

Thus, multiple added-on elements 28, such as joints, are positioned in the external box 24 and are connected by fasteners 30 to the front longitudinal wall 20. According to one embodiment, each fastener 30 comprises two parts, such as a screw and a nut for example, which are positioned on either side of the front longitudinal wall 20.

Blind-type fasteners installed from a single side of the front longitudinal wall 20 cannot be used since the applied loads are too great.

Consequently, the regions located on either side of the front longitudinal wall 20 must be accessible in order to install the two parts of each fastener 30.

According to one embodiment, the wing 14 comprises approximately 20 components made of composite material so as to form, inter alia, the longitudinal walls 20, the upper and lower walls 16.1, 16.2, and metallic added-on elements 28.

According to one operating approach, the front longitudinal wall 20 is pierced and then the added-on elements 28 are fastened thereto using fasteners 30. Then, the various composite-material components of the wing 14 are assembled using fittings. According to this operating approach, more than a thousand fittings are required in order to assemble the wing 14, which requires considerable assembly time and results in significant on-board mass.

There exist so-called “one-shot” methods for producing a box-type structure, by means of which the various composite material components of the wing 14 can be assembled in a single operation, for example using co-curing techniques.

However, it has hitherto not been possible to implement these techniques as it is difficult or even impossible to install, by hand, a part of each fastener 30 in the internal box 22 from one end of the wing 14. Even when using a rigid telescopic stick having a gripper at one end, as illustrated in U.S. Pat. No. 10,328,568, it is difficult to hold a screw using the gripper of the telescopic stick, to insert it into the interior region of the internal box 22 from one end of the wing to a through-orifice, and to insert it into this through-orifice from the interior region of the internal box while holding the second end of the telescopic stick.

The present invention seeks to remedy all or some of the drawbacks of the prior art.

To that end, the invention relates to a method for installing a fastener in at least one through-orifice of a box-type structure, the fastener comprising at least first and second parts, the first part comprising a shank that extends between first and second ends and a head secured to the first end of the shank, the second part cooperating with the second end of the shank when in an assembled state, the through-orifice being provided in a wall of the box-type structure separating an internal region from an external region, the internal region opening at at least one end of the box-type structure.

SUMMARY OF THE INVENTION

According to the invention, the method comprises:

- a step of inserting a body of a first tool into the through-orifice from the external region in order to position this body in the internal region,
- a step of moving the body of the first tool towards the end of the box-type structure, as far as a position that makes it accessible from the end of the box-type structure,
- a step of securing the first part of the fastener to the body, the first tool comprising a link that is connected to the body which remains accessible from the external region during the inserting, moving and securing steps, the link being flexible or semi-rigid in order to be able to bend elastically in order to slide into the internal region as far as the end of the box-type structure,
- a step of pulling on the link from the external region in order to move the body and the first part of the fastener towards the first through-orifice until the shank of the first part of the fastener is positioned in the through-orifice,
- a step of separating the body from the first part of the fastener.

This method makes it possible to install fasteners comprising two parts, even if the internal region is not accessible. This makes it possible to produce the box-type structure by assembling its various components in a single operation prior to fastening of the added-on elements. This solution makes possible a significant reduction in the number of fasteners required for assembling an aircraft wing, leading to reductions in the on-board mass and assembly time.

According to another feature, during the moving step, a second tool comprising a rigid shaft and a system for grasping the body, this being attached to one end of the shaft, is manipulated from the end of the box-type structure in order to move the body of the first tool towards the end of the box-type structure.

According to another feature, the body of the first tool is cylindrical and comprises a first end to which the link is connected, and a second end comprising a tip that is configured to temporarily secure the second end of the shank of the first part of the fastener.

According to another feature, during the securing step, the tip is inserted into a hole provided at the second end of the shank of the first part of the fastener.

The invention also relates to a method for assembling an added-on element and a box-type structure comprising the steps of the method for installing a fastener in a through-orifice of the box-type structure according to one of the preceding features, a step of mounting the added-on element, then a step of installing the second part of the fastener on the shank so as to obtain the assembled state.

The invention also relates to a tooling for carrying out the method, wherein the tooling comprises a first tool comprising a body and a link connected to the body, the body being configured to pass through the through-orifice, the link being long enough to remain accessible from the external region when the body occupies a position that is accessible from the end of the box-type structure, the link being flexible or semi-rigid in order to be able to bend elastically in order to slide into an internal region of a box-type structure.

According to another feature, the body of the first tool is cylindrical and comprises a first end to which the link is connected, and a second end comprising a tip that is configured to temporarily secure a first part of a fastener.

According to another feature, the tip is configured to fit with a certain amount of resistance into a hole provided at a second end of a shank of the first part of the fastener.

According to another feature, the link comprises at least one end segment connected to the semi-rigid body.

According to another feature, the tooling comprises a second tool comprising a rigid shaft and a system for grasping the body, this being attached to one end of the shaft, the shaft being long enough to allow the grasping system to reach the body when held at the end of the box-type structure.

According to another feature, the system for grasping the body is a magnet and the body is metallic or made of a magnetic material.

BRIEF DESCRIPTION OF THE DRAWINGS

Other features and advantages will become apparent from the following description of the invention, which description is given solely by way of example, with reference to the appended drawings in which.

DETAILED DESCRIPTION OF THE PREFERRED EMBODIMENTS

Figure 1:
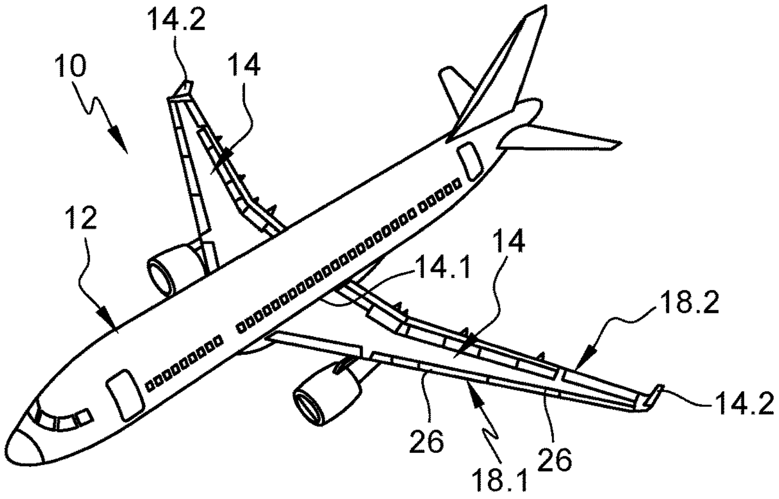
Fig. 1 Prior Art
FIG. 1 is a perspective view of an aircraft.
Figure 2:
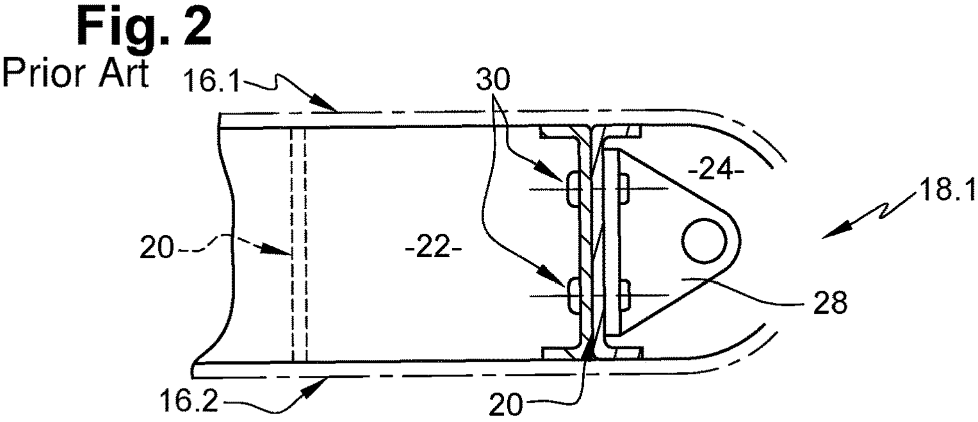
Fig. 2 Prior Art
FIG. 2 is a cross section through a front longitudinal wall of an aircraft wing, to which there is fastened an added-on element illustrating an embodiment of the prior art.
Figure 3:
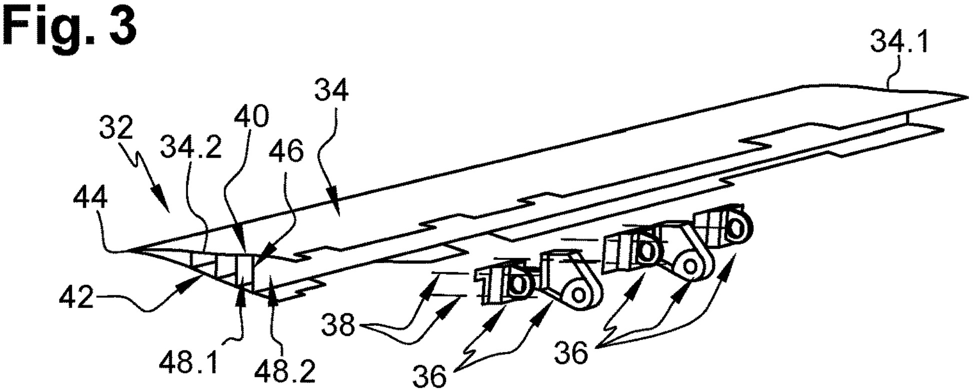
FIG. 3 is a perspective view of a box-type structure, such as an aircraft wing, to which added-on elements illustrating an embodiment of the invention are to be fastened.
Figure 4:
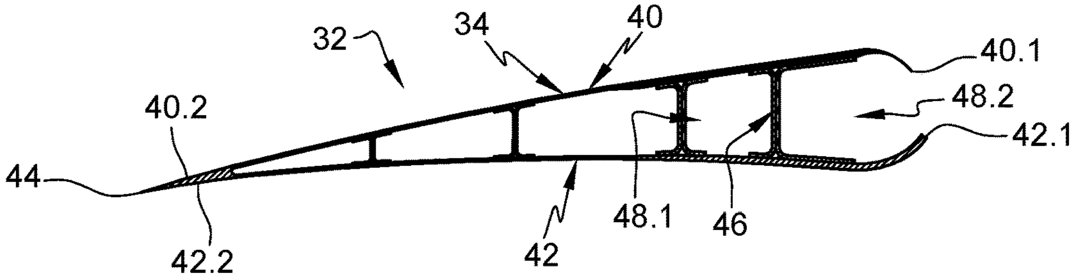
FIG. 4 is a cross section through the box-type structure shown in FIG. 3.
Figure 12:
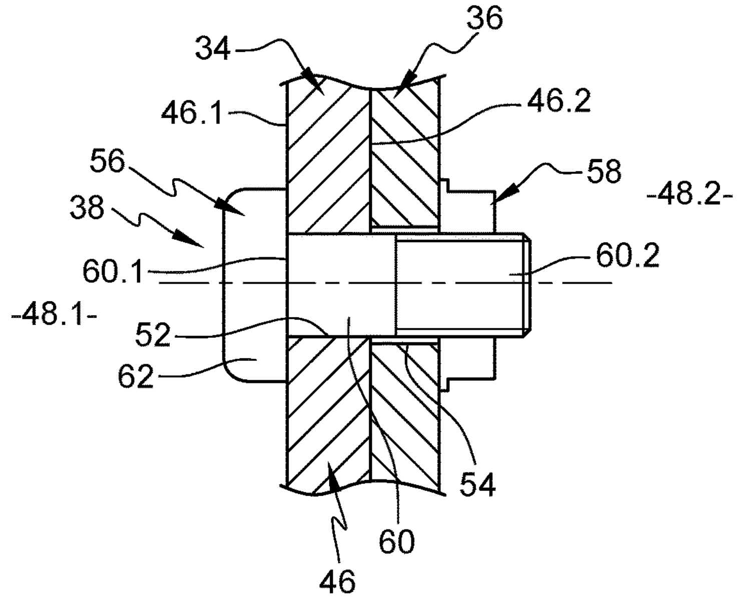
FIG. 12 is a section through part of a box-type structure and through an added-on element fastened to the box-type structure using a fastener.

According to one embodiment, shown in FIGS. 3, 4 and 12, an aircraft structure 32, such as a wing for example, comprises a box-type structure 34, at least one added-on element 36 and at least one fastener 38 that connects the added-on element 36 to the box-type structure 34.

According to one configuration, the box-type structure 34 comprises an upper wall 40 which extends between a front edge 40.1 and a rear edge 40.2, and a lower wall 42 which extends between a front edge 42.1 and a rear edge 42.2. The rear edges 40.2, 42.2 of the upper and lower walls 40, 42 are connected at a trailing edge 44. The front edges 40.1, 42.1 of the upper and lower walls 40, 42 are mutually parallel and spaced apart from one another. The box-type structure 34 also comprises at least one front longitudinal wall 46 (also termed front longitudinal partition) that connects the upper and lower walls 40, 42 and divides the space between the upper and lower walls 40, 42 into an internal region 48.1 that is located on a first side of the front longitudinal wall 46 and is oriented towards the trailing edge 44, and an external region 48.2 that is located on a second side of the front longitudinal wall 46 and is open between the front edges 40.1, 42.1 of the upper and lower walls 40, 42. The added-on elements 36 are positioned in the external region 48.2 and are fastened to the front longitudinal wall 46.

The front longitudinal wall 46 comprises an internal face 46.1 that is oriented towards the internal region 48.1, and an external face 46.2 that is oriented towards the external region 48.2.

The box-type structure is tubular in shape and extends in a longitudinal direction. Thus, the internal region 48.1 is open at at least a first end 34.1 of the box-type structure 34. According to one configuration, the internal region 48.1 is open at each end 34.1, 34.2 of the box-type structure 34.

According to one embodiment, the box-type structure 34 is made of composite material. According to one assembly approach, the box-type structure 34 is produced according to a so-called "one-shot" production method, by which it is possible to assemble the various components made of composite material in a single operation.

According to one embodiment, the front longitudinal wall 46 comprises, for each fastener 38, a first through-orifice 52 that connects the internal and external regions 48.1, 48.2 and is configured to accommodate the fastener 38. In parallel, the added-on element 36 comprises a second through-orifice 54 that is configured to accommodate the fastener 38. This first through-orifice 52 can be remote from the first and second ends 34.1, 34.2 of the box-type structure 34.

According to one embodiment, shown in FIG. 12, each fastener 38 comprises at least first and second parts 56, 58 that are configured to adopt a separated state and an assembled state in order to provide a connection between the added-on element 36 and the front longitudinal wall 46.

According to one configuration, the first part 56 comprises a shank 60 that extends between first and second ends 60.1, 60.2 and a head 62 secured to the first end 60.1 of the shank 60. The second part 58 cooperates with the second end 60.2 of the shank 60 when in the assembled state. In operation, the shank 60 is accommodated in the first and second through-orifices 52, 54, the head 62 is clamped against the internal face 46.1 of the front longitudinal wall 46 and the second part 58 is clamped against the added-on element 36.

According to one embodiment, the fastener 38 is a bolt, the first part 56 being a screw and the second part 58 a nut.

The shank 60 has a diameter substantially equal to that of the first through-orifice 52 in order that, once inserted into the first through-orifice 52, the shank 60 is held there by friction.

A tooling is used in order to position the shank 60 of the fastener 38 in the first through-orifice 52, from the internal region 48.1.

This tooling comprises a first tool 64 comprising a body 66 and a link 68 connected to the body 66. The body 66 is configured to pass through the first through-orifice 52. According to one embodiment, shown in particular in FIG. 5, the body 66 is substantially cylindrical in shape, having a diameter smaller than that of the first through-orifice 52. This body 66 comprises a first end 66.1 to which the link 68 is connected, and a second end 66.2 comprising a tip 70 that is configured to temporarily secure the second end 60.2 of the shank 60 of the first part 56 of the fastener 38.

According to one configuration, the body 66 is metallic or made of a magnetic material. The tip 70 is threaded such that it can be screwed into a tapped hole 72 provided at the second end 60.2 of the shank 60 of the first part 56 of the fastener 38. Of course, the invention is not limited to this configuration in order to obtain a temporary connection between the shank 60 of the first part 56 of the fastener 38 and the body 66 of the first tool 64. Thus, it is possible for the tip 70 to not be threaded, and to fit with a certain amount of resistance into a smooth hole 72 provided at the second end 60.2 of the shank 60 of the first part 56 of the fastener 38. As a variant, the tip 70 might comprise a recess that is configured to receive the second end 60.2 of the shank 60 of the first part 56 of the fastener 38.

According to one configuration, the body 66 is configured so as to be easier to see in a dark place. By way of example, it comprises at least one fluorescent marking or is coated with fluorescent paint.

According to one embodiment, the link 68 is long enough to remain accessible from the external region 48.2 when the body 66 is in a position that is accessible from the end 34.1 of the box-type structure 34.

The link 68 is semi-rigid in order to be able to bend elastically so as to slide into the internal region 48.1 as far as one of the ends 34.1, 34.2 of the box-type structure 34. According to another embodiment, the link 68 is flexible, such as a wire for example, and comprises an end segment 74 connected to the semi-rigid body 66.

The link 68 has a cross section smaller than that of the body 66 so as to avoid rubbing at the first through-orifice 52, and to avoid disturbing the movement of the body 66 in the internal region 48.1.

According to one embodiment, the tooling comprises a second tool 76 comprising a rigid shaft 78 and a magnet 80 fastened to one end of the shaft 78. This shaft 78 is long enough to reach the body 66 when it is held outside the box-type structure 34. Of course, the invention is not restricted to this embodiment for the second tool 76, which is provided for removing the first tool 64, from the internal region 48.1, from one of the ends 34.1, 34.2 of the box-type structure 34. Thus, the magnet 80 might be replaced with a gripper or any other system for grasping the body 66.

In certain cases, the second tool 76 is not necessary if the body 66 of the first tool 64 moves alone towards one of the ends 34.1, 34.2 of the box-type structure 34, as far as a position in which it becomes accessible for securing the first part 56 of the fastener 38. By way of example, the body 66 of the first tool 64 may move alone, under gravity, towards one of the ends 34.1, 34.2 of the box-type structure 34 if the latter is oriented vertically.

Figure 5:
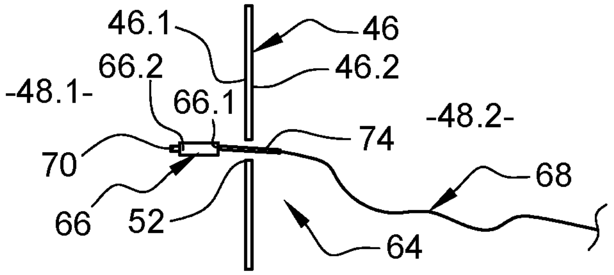
FIG. 5 is a schematic depiction of a wall of a box-type structure comprising an orifice through which a body of a first tool, used for installing a first part of a fastener in the orifice, is inserted, illustrating an embodiment of the invention.

A method for installing a fastener 38 comprises a step of inserting the body 66 of the first tool 64 into the through-orifice 52 of the front longitudinal wall 46 from the external region 48.2, as illustrated in FIG. 5, in order to position this body in the internal region 48.1.

Figure 6:
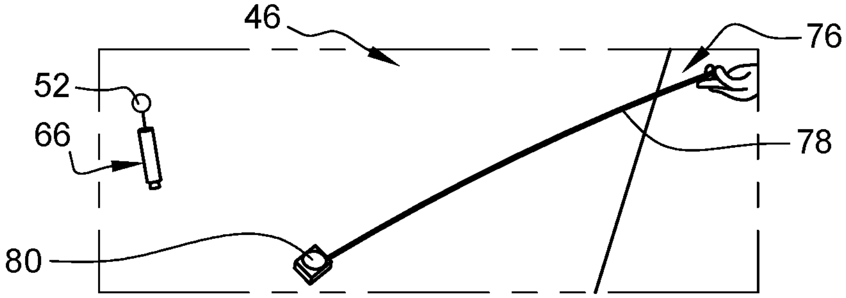
FIG. 6 is a perspective view, from inside the box-type structure, of a second tool that is used to remove the body of the first tool from the box-type structure, illustrating an embodiment of the invention.
Figure 7:
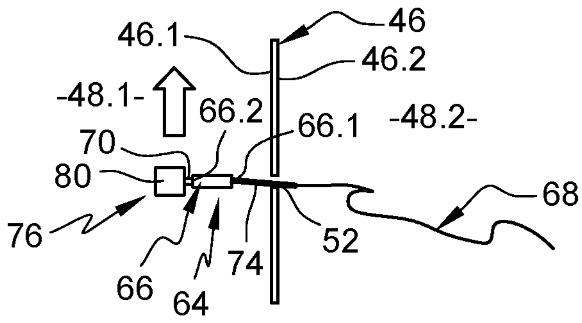
FIG. 7 is a schematic depiction of the first and second tools shown in FIGS. 5 and 6.
Figure 8:
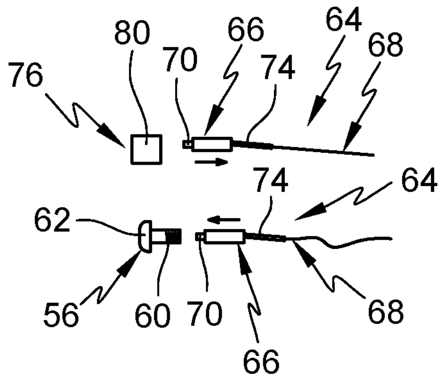
FIG. 8 is a schematic depiction of a step of securing a first part of a fastener to the body of the first tool.

As shown in FIGS. 6 and 7, the method comprises a step of moving the body 66 of the first tool 64 towards one of the ends 34.1, 34.2 of the box-type structure 34 as far as a position in which it becomes accessible for securing the first part 56 of the fastener 38. To that end, the second tool 76 is manipulated from one of the ends 34.1, 34.2 of the box-type structure 34, its rigid shaft 78 being inserted into the internal region 48.1 until the magnet 80 magnetizes the body 66 of the first tool 64, as depicted in FIG. 7. Thence, the second tool 76 is manipulated in such a way as to move the body 66 of the first tool 64 towards one of the ends 34.1, 34.2 of the box-type structure 34 in order to make it sufficiently accessible. As shown in FIG. 8, the body 66 is separated from the magnet 80.

Figure 9:
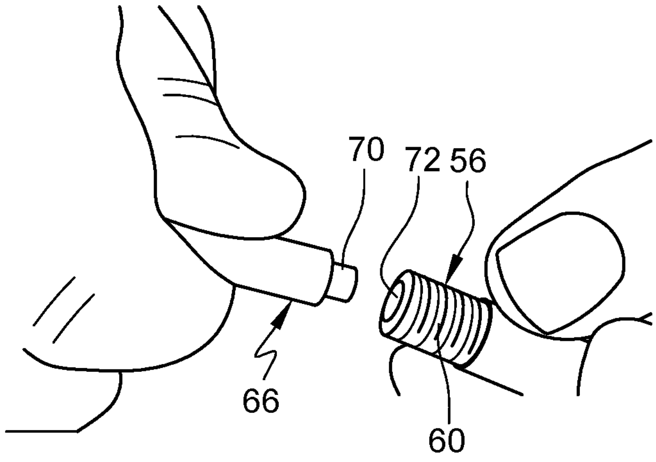
FIG. 9 is a perspective view of a step of securing a first part of a fastener to the body of the first tool.

The method comprises a step of securing the first part 56 of the fastener 38 to the body 66, as illustrated in FIG. 9. During the inserting, moving and securing steps, the link 68 of the first tool 64 remains in position passing through the first through-orifice 52 and remains accessible from the external region 48.2.

Figures 10A, 10B, 10C:
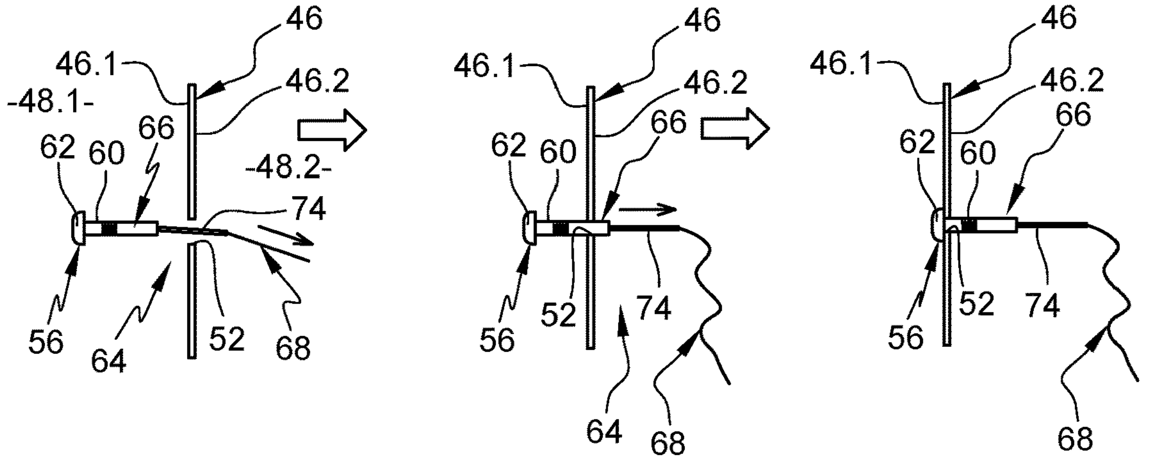
FIGS. 10*a*, 10*b* and 10*c* are a schematic depiction of a step of installing the first part of the fastener in an orifice by means of the first tool, at various moments.

The method comprises a step of pulling on the link 68 from the external region 48.2 in order to move the body 66 and the first part 56 of the fastener 38 towards the first through-orifice 52 (FIG. 10*a*), then the body 66 is removed from the internal region 48.1 via the first through-orifice 52 until the shank 60 of the first part 56 of the fastener 38 is positioned in the first through-orifice 52 (FIG. 10*b*), the head 62 then being clamped against the internal face 46.1 of the front longitudinal wall 46, as illustrated in FIG. 10*c*.

Figure 11:
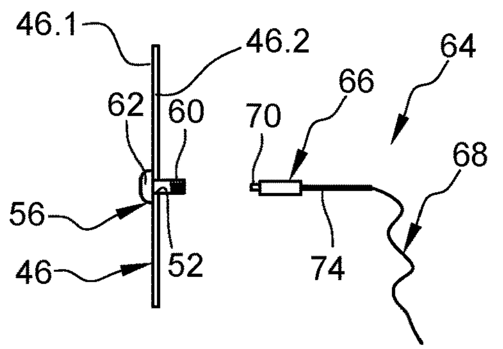
FIG. 11 is a schematic depiction of the first part of the fastener positioned in the orifice, and of the first tool detached from the first part.

Finally, the method for installing the fastener 38 comprises a step of separating the body 66 of the first tool 64 from the first part 56 of the fastener 38, as illustrated in FIG. 11.

A method for assembling the added-on element 36 and the box-type structure 34 comprises, in addition to the preceding steps of the method for installing the first part 56 of the fastener 38, a step of mounting the added-on element 36 then a step of installing the second part 58 of the fastener 38 on the shank 60 so as to obtain the assembled state, as illustrated in FIG. 12.

This method makes it possible to be able to fasten added-on elements 36 to the front longitudinal wall 46 using fasteners 38 in two parts 56, 58 even if the internal region 48.1 is not accessible. This makes it possible to produce the box-type structure 34 of the wing by assembling its various components in a single operation prior to fastening of the added-on elements 36. This solution makes possible a significant reduction in the number of fasteners required for assembling an aircraft wing, leading to reductions in the on-board mass and assembly time.

Of course, the invention is not restricted to the assembly of an aircraft wing. It may be used when it is necessary to fasten at least one added-on element 36 to a box-type structure 34 using at least one fastener 38 accommodated in a through-hole 52 provided in a wall 46 of the box-type structure 34, said wall 46 separating internal and external regions 48.1, 48.2, the internal region 48.1 being open at at least one end 34.1 of the box-type structure 34.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A method for installing a fastener in at least one through-orifice of a box-type structure, the fastener comprising at least first and second parts, the first part comprising a shank that extends between first and second ends and a head secured to the first end of the shank, the second part cooperating with the second end of the shank when in an assembled state, the through-orifice being provided in a wall of the box-type structure separating an internal region from an external region, the internal region opening at at least one end of the box-type structure; the method comprising:

inserting a body of a first tool into the through-orifice from the external region to position the body in the internal region, moving the body of the first tool towards the at least one end of the box-type structure, as far as a position that makes it accessible from the at least one end of the box-type structure, securing the first part of the fastener to the body, the first tool comprising a link connected to the body which remains accessible from the external region during the inserting, moving and securing steps, the link being flexible or semi-rigid to be able to bend elastically to slide into the internal region as far as the at least one end of the box-type structure, pulling on the link from the external region to move the body and the first part of the fastener towards the first through-orifice until the shank of the first part of the fastener is positioned in the through-orifice, separating the body from the first part of the fastener, wherein, during the moving step, a second tool comprising a rigid shaft and a system for grasping the body, the system being attached to one end of the shaft, is manipulated from the at least one end of the box-type structure to move the body of the first tool towards the at least one end of the box-type structure.

2. The method as claimed in claim 1, wherein the body of the first tool is cylindrical and comprises a first end to which the link is connected, and a second end comprising a tip that is configured to temporarily secure the second end of the shank of the first part of the fastener.

3. The method as claimed in claim 2, wherein, during the securing step, the tip is inserted into a hole provided at the second end of the shank of the first part of the fastener.

4. A method for assembling an added-on element and a box-type structure, comprising:

the steps of the method for installing a fastener in a through-orifice of the box-type structure as claimed in claim 1, mounting the added-on element to the wall of the box-type structure at the through-orifice, then installing the second part of the fastener on the shank to obtain the assembled state.

* * * * *